W. F. GRIFFIN.
BOLL WEEVIL EXTERMINATOR.
APPLICATION FILED AUG. 25, 1913.
1,109,060. Patented Sept. 1, 1914.
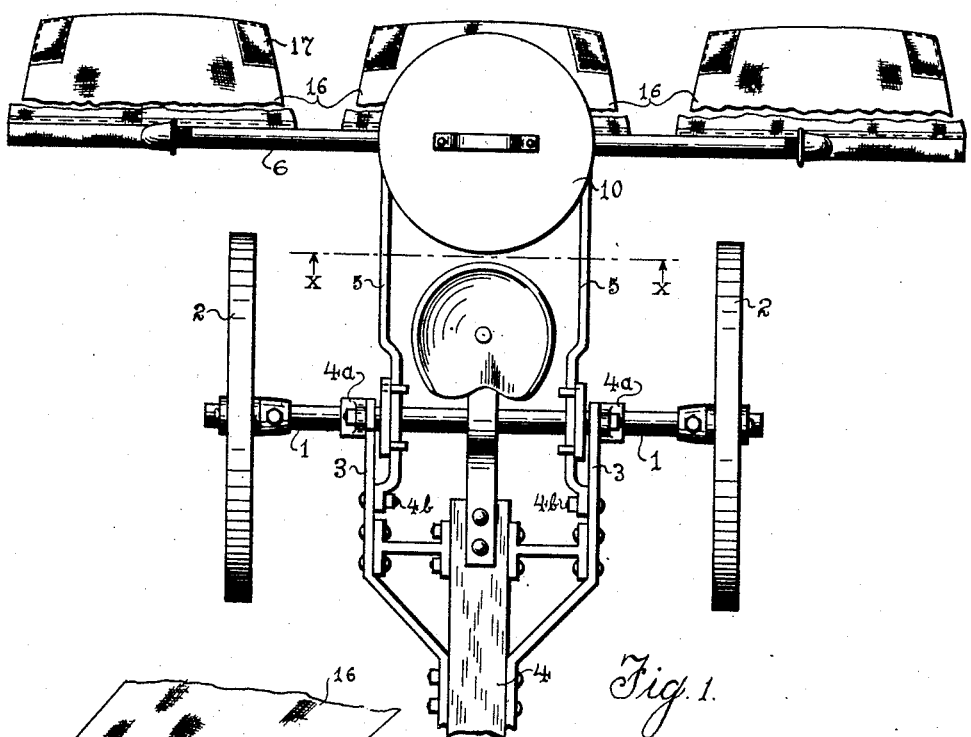
Fig. 1.
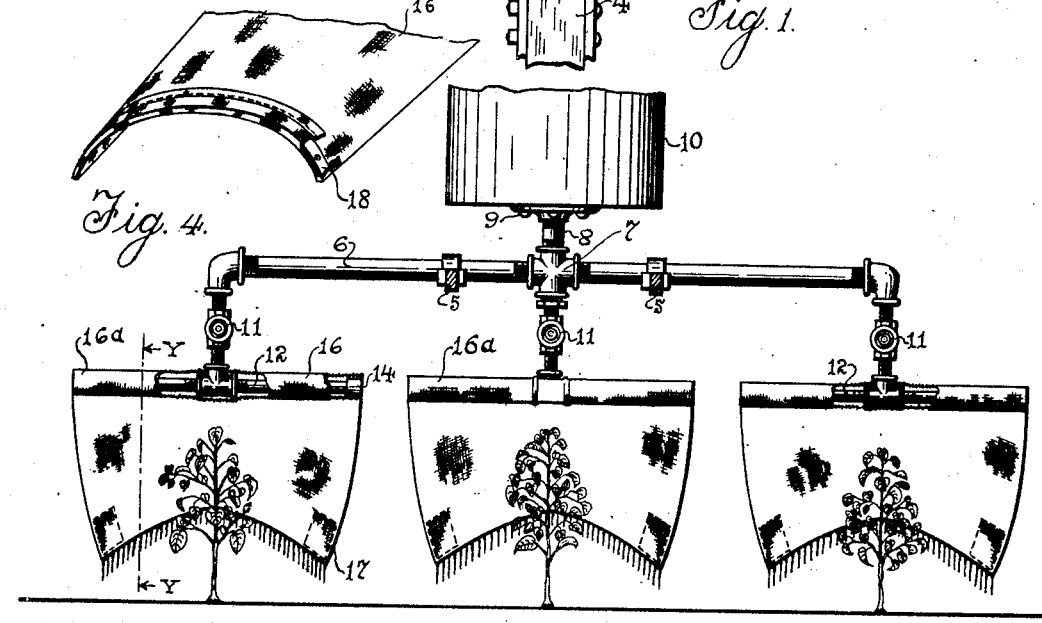
Fig. 4. Fig. 2.
Fig. 3.
WITNESSES:
C. A. Ellis.
INVENTOR
W. F. Griffin.
BY John M. Spellman.
ATTORNEY

UNITED STATES PATENT OFFICE.

WILLIS F. GRIFFIN, OF COTTONWOOD, TEXAS.

BOLL-WEEVIL EXTERMINATOR.

1,109,060.   Specification of Letters Patent.   Patented Sept. 1, 1914.

Application filed August 25, 1913.   Serial No. 786,361.

*To all whom it may concern:*

Be it known that I, WILLIS F. GRIFFIN, citizen of the United States, residing at Cottonwood, in the county of Callahan and State of Texas, have invented certain new and useful Improvements in Boll-Weevil Exterminators, of which the following is a specification.

My invention relates to a new and useful insect destroying machine. Its object is to provide an insect-destroying machine comprising a wheeled frame, carrying a tank containing a fluid inimical to insect life, from which tank said fluid will be gradually distributed to a plurality of aprons, which, as the machine travels through a field will respectively drag over rows of plants, moistening the plants with the fluid.

An especial object of my invention is to provide a machine that will serve to expeditiously and efficiently destroy the boll weevil and other parasites with which growing cotton is frequently infested.

A further object is to provide a machine which may be employed at a certain period in the growth of cotton to check the growth of the cotton by applying to the same a certain chemical that will stop the development of the plants, thereby causing the vitality of the plants to be centralized in the cotton bolls, increasing their number and improving the quality of the staple.

Finally, the object of my invention is to provide a device of the character described that will be strong, durable, simple and efficient, and comparatively easy to construct, also one that will not be likely to get out of working order.

With these and various other objects in view, my invention has relation to certain novel features of operation and construction, an example of which is described in the following specification, and illustrated in the accompanying drawing, wherein:

Figure 1 is a plan view of my insect-destroying machine. Fig. 2 is a view showing the rear portion of the machine in sectional elevation, the section being taken upon the line X—X of Fig. 1. Fig. 3 is a detail sectional view of one of my fluid-distributing aprons with the pipe supporting the same, the section being taken upon the line Y—Y of Fig. 2. Fig. 4 is a detail perspective view showing a modified form of said apron.

Referring now more particularly to the drawing, wherein like reference characters designate similar parts in all the figures, the numeral 1 denotes an axle carrying a pair of transporting wheels 2 upon its extremities and supporting upon its middle portion, the rear extremities of a pair of parallel bars 3, converging at their forward ends and bolted to a tongue 4. The connection between the bars 3 and the axle 1 is established through a pair of brackets 4ª. Upon the bars 3 a short distance in front of the axle, there is oppositely mounted a pair of pins 4ᵇ, upon which are respectively pivoted the forward ends of a pair of parallel bars 5 projecting rearwardly beyond the transporting wheel and resting upon the axle. The rear extremities of the bars 5 serve to support a pipe 6 rigidly and transversely mounted upon said bars. Midway between the bars 5, a cross 7 is interposed in the pipe 6, two of its outlets being in communication with said pipe, and its other two outlets being vertically alined. The top outlet of the cross 7 has communication with a nipple or short pipe 8 which is surmounted by a flange 9, rigidly supporting a tank or reservoir 10. The contents of the tank 10 are free to enter the pipe 6 through the nipple 8 and cross 7. The lowermost outlet of the cross 7 has communication through a cut-off valve 11 with the middle of a short horizontal pipe 12 parallel to the pipe 6. Each extremity of the pipe 6 also has communication through a valve 11 with the middle of a short horizontal pipe 12, the three pipes 12 being in alinement, with their centers spaced from each other a distance equal to that usually provided between rows of cotton plants. Each pipe 12 is provided with a line of perforations 13, adapted to discharge a fluid from said pipes downwardly at a slightly rearward inclination. The extremities of the three pipes 12 are closed and are capped as indicated at 14. An apron 16, formed of some durable fabric such as canvas or burlap, is suspended from each pipe 12, the upper edge portion of each apron being preferably given the form of a tube 16ª extending between the caps 14 to which the extremities of said edge portion are secured. An aperture will be provided at the center of the upper edge portion of each apron to permit connection to be established between the correlated pipe 12 and the pipe 6. Thus it will be seen that the upper portion of the apron is slightly spaced from the correlated pipe 12 so that the apron may not impede the discharge of fluid through the perforations 13.

The aprons 16 will preferably be provided at their lower corners with pockets 17 which will be filled with sand or dirt. Thus, as the aprons are dragged along the rows of plants during the use of the machine, they will be held down in constant contact with the plants by the weight of the loaded pockets 17.

The bottom edge of each apron may be provided with fringe as shown in Figs. 2 and 3. It is obvious that the fringe will tend to more thoroughly distribute the liquid and will pass between the leaves and branches.

During the use of the above described machine, the valves 11 will be so regulated that there will be a constant gradual flow of fluid into each pipe 12 which fluid, escaping through the perforations 13, will keep the aprons 16 saturated so that the rows of plants with which the aprons are contiguous during the travel of the machine, will be thoroughly moistened with the fluid.

While I do not limit myself to the use of any particular insect-destroying fluid, I have found that a mixture of highly diluted carbolic acid with a mineral oil is very efficacious in destroying insect life. This mixture may be so proportioned that it will serve to check the growth of the plants without destroying their vitality, causing the vigor of the plants to be concentrated in the bolls, increasing the size and number thereof.

In the modified form of apron which is illustrated in Fig. 4, a gradually arched metal bar 18 is secured to the lower edge of the apron, serving to weight the same and hold the same to a form that will cause it to readily hold its place upon the row of plants over which it is being dragged.

Any common and well known means (not shown), may be employed to adjust the bars 5 vertically about the pivots formed by the pins 5. The invention is presented as including all such modifications and changes as may properly come within the scope of the following claims.

What I claim is:

1. In a device of the character described, the combination with a wheel-frame, of a tank carried by said frame containing an insect-destroying liquid, a pipe mounted transversely upon the machine having communication with said tank, a plurality of shorter pipes alined with each other and parallel to the pipe first specified, each of the shorter pipes being provided with a line of perforations, and a flexible apron suspended from each of the smaller pipes in position to be saturated with the liquid.

2. In a device of the character described, the combination with a wheel-frame, of a tank carried by said frame containing an insect-destroying liquid, a pipe mounted transversely upon the machine having communication with said tank and provided with a line of perforations, and an apron suspended from said pipe formed of some flexible material and in position to be saturated with the liquid.

3. In a device of the character described, the combination with a wheel-frame, of a tank carried by said frame, containing an insect-destroying fluid, a pipe mounted transversely upon the machine, having communication with said tank and formed with a line of perforations, caps mounted upon the extremities of said pipe, and an apron suspended from said pipe having its upper edge portion forming a tube extending between the caps carried by the pipe.

4. In a device of the character described, the combination with a wheel-frame, of a pair of bars pivoted upon the frame extending rearwardly therefrom, a pipe transversely carried by the rear extremities of said bars, a tank containing an insect-destroying liquid centrally mounted upon said pipe and having communication therewith, a plurality of supplementary pipes mounted beneath the first specified pipe mounted parallel to the same, each of the supplementary pipes having its extremities closed and being provided with a line of perforations, and an apron suspended from each supplementary pipe in position to be saturated with the liquid.

In testimony whereof I have signed my name to this specification in the presence of two subscribing witnesses.

WILLIS F. GRIFFIN.

Witnesses:
  B. W. EVERETT,
  PAUL RAMSAY.